United States Patent
Briscoe

(10) Patent No.: US 9,985,899 B2
(45) Date of Patent: May 29, 2018

(54) RE-MARKING OF PACKETS FOR QUEUE CONTROL

(71) Applicant: BRITISH TELECOMMUNICATIONS PUBLIC LIMITED COMPANY, London (GB)

(72) Inventor: Robert John Briscoe, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 235 days.

(21) Appl. No.: 14/780,685

(22) PCT Filed: Mar. 27, 2014

(86) PCT No.: PCT/GB2014/000121
§ 371 (c)(1),
(2) Date: Sep. 28, 2015

(87) PCT Pub. No.: WO2015/155043
PCT Pub. Date: Oct. 2, 2014

(65) Prior Publication Data
US 2016/0057065 A1    Feb. 25, 2016

(30) Foreign Application Priority Data

Mar. 28, 2013  (EP) ...................... 13250049
Apr. 18, 2013  (GB) .................... 1307077.6

(51) Int. Cl.
*H04L 12/835* (2013.01)
*H04L 12/863* (2013.01)
(Continued)

(52) U.S. Cl.
CPC ............ *H04L 47/30* (2013.01); *H04L 47/263* (2013.01); *H04L 47/31* (2013.01); *H04L 47/624* (2013.01)

(58) Field of Classification Search
CPC ........ H04L 47/30; H04L 47/31; H04L 47/624
See application file for complete search history.

(56) References Cited

U.S. PATENT DOCUMENTS 6,128,642 A    10/2000  Doraswamy et al.
6,215,769 B1    4/2001  Ghani et al.
(Continued)

FOREIGN PATENT DOCUMENTS

CN    1545286    11/2004
CN    101034346    9/2012
(Continued)

OTHER PUBLICATIONS

English translation of Search Report dated Oct. 19, 2017, issued in corresponding Chinese Application No. 201480018721.3 (2 pages.).
(Continued)

*Primary Examiner* — Ayaz Sheikh
*Assistant Examiner* — Debebe Asefa
(74) *Attorney, Agent, or Firm* — Nixon & Vanderhye PC

(57) ABSTRACT

A method and apparatus for changing a packet tag status value from a first value to a different value upon said packet arriving at a buffer if there already is a packet in the buffer queue having the same first status value. A sequence of tag status values (112) in packets received at an end node is used to determine the queue length of the buffer in the packet network. An end node can thereafter adapt its sending rate to the rate of the buffer.

18 Claims, 8 Drawing Sheets

Schematic of a Typical Network

(51) Int. Cl.
  H04L 12/825 (2013.01)
  H04L 12/833 (2013.01)

(56) References Cited

U.S. PATENT DOCUMENTS

| | | | |
|---|---|---|---|
| 6,252,848 B1 | 6/2001 | Skirmont | |
| 6,317,416 B1 | 11/2001 | Giroux et al. | |
| 6,618,378 B1 | 9/2003 | Giroux et al. | |
| 6,646,987 B1 | 11/2003 | Qaddoura | |
| 6,839,321 B1 | 1/2005 | Chiruvolu | |
| 7,095,750 B2 | 8/2006 | Craddock et al. | |
| 7,324,535 B1 | 1/2008 | Goss et al. | |
| 7,372,865 B2 * | 5/2008 | Scott | H04L 43/0858 370/394 |
| 7,680,038 B1 | 3/2010 | Gourlay | |
| 9,860,184 B2 | 1/2018 | Briscoe | |
| 2002/0078164 A1 | 6/2002 | Reinschmidt | |
| 2002/0080768 A1 | 6/2002 | Garcia-Luna-Aceves et al. | |
| 2002/0097719 A1 | 7/2002 | Chaskar et al. | |
| 2002/0114340 A1 | 8/2002 | Kumazawa et al. | |
| 2003/0007454 A1 | 1/2003 | Shorey | |
| 2004/0095935 A1 * | 5/2004 | Connor | H04L 47/10 370/392 |
| 2004/0218617 A1 | 11/2004 | Sagfors | |
| 2005/0135248 A1 | 6/2005 | Ahuja et al. | |
| 2005/0190779 A1 | 9/2005 | Hoffman et al. | |
| 2006/0013241 A1 | 1/2006 | Yamatsu et al. | |
| 2006/0072628 A1 | 4/2006 | Liu et al. | |
| 2006/0184664 A1 | 8/2006 | Jung | |
| 2006/0262720 A1 | 11/2006 | Charny et al. | |
| 2007/0006229 A1 | 1/2007 | Moore | |
| 2007/0047446 A1 * | 3/2007 | Dalal | H04L 45/02 370/237 |
| 2007/0081454 A1 | 4/2007 | Bergamasco et al. | |
| 2008/0298391 A1 | 12/2008 | Feroz et al. | |
| 2009/0003369 A1 | 1/2009 | Lundin | |
| 2009/0232001 A1 | 9/2009 | Gong et al. | |
| 2010/0278042 A1 | 11/2010 | Monnes et al. | |
| 2013/0044598 A1 | 2/2013 | Zhang et al. | |
| 2013/0088997 A1 | 4/2013 | Briscoe et al. | |
| 2014/0068008 A1 | 3/2014 | Tzhori et al. | |
| 2014/0341015 A1 | 11/2014 | Johansson et al. | |
| 2016/0057065 A1 | 2/2016 | Briscoe | |
| 2016/0182387 A1 | 6/2016 | Briscoe | |

FOREIGN PATENT DOCUMENTS

| | | |
|---|---|---|
| EP | 0 853 441 | 7/1998 |
| EP | 1 179 925 | 2/2002 |
| EP | 1 399 849 | 3/2004 |
| EP | 1496652 | 1/2005 |
| EP | 1 734 707 | 12/2006 |
| EP | 2 784 997 | 10/2014 |
| EP | 2 869 514 | 5/2015 |
| WO | WO 93/14605 | 7/1993 |
| WO | 02/103579 | 12/2002 |
| WO | WO 2009/118602 | 10/2009 |
| WO | WO 2015/078492 | 6/2015 |
| WO | WO 2017/021046 | 6/2016 |
| WO | WO 2017/021048 | 6/2016 |

OTHER PUBLICATIONS

International Search Report and Written Opinion of the ISA for PCT/EP2016/063867, dated Aug. 31, 2016, 11 pages.
Written Opinion of the IPEA for PCT/EP2016/063867, dated Jul. 3, 2017, 7 pages.
International Preliminary Report on Patentability for PCT/EP2016/063867, dated Aug. 14, 2017, 15 pages.
Search Report for EP15180017.4, dated Jan. 29, 2016, 9 pages.
Search and Examination Report for GB1513935.5, dated Mar. 15, 2016, 5 pages.
Jacobson et al., "Congestion Avoidance and Control", Nov. 1988, 25 pages.
International Search Report and Written Opinion for PCT/EP2016/063871, dated Aug. 31, 2016, 11 pages.
International Preliminary Report on Patentability for PCT/EP2016/063871, dated Aug. 14, 2017, 13 pages.
Extended Search Report for EP 15180007.5, dated Jan. 29, 2016, 9 pages.
Combined Search and Examination Report for GB 1513926.4, dated Mar. 15, 2016, 5 pages.
Written Opinion of the ISA for PCT/EP2016/063871, dated Jul. 3, 2017, 7 pages.
M. Alizadeh et al., "Less is More: Trading a little Bandwidth for Ultra-Low Latency in the Data Center", $9^{th}$ USENIX Symposium on Networked Systems Design and Implementation, Apr. 25-27, 2012 (14 pgs.).
D. Cavendish et al., "CapStart: An Adaptive TCP Slow Start for High Speed Networks", 2009 First International Conference on Evolving Internet, Aug. 23-29, 2009 (6 pgs.).
International Search Report for PCT/GB2014/000121 dated May 22, 2014, (3 pages).
International Search Report for PCT/GB2014/000300, dated Jan. 5, 2015 (4 pages).
L.N. de Castro, "Artificial immune systems as a novel soft computing paradigm", Soft Computing 7, 2003, (20 pages) Springer-Verlag.
Liu, D. et al., "Congestion Control Without a Startup Phase", Case Western Reserve University, International Computer Science Institute, Proc. PFLDnet, 2007 (6 pgs.).
Muschamp, "An Introduction to Web Services", BT Technology Journal, vol. 22 No. 1 18, Jan. 2004 (10 pages).
N Kaveh, et al., NEXUS—resilient intelligent middleware, BT Technology Journal, vol. 22, No. 3, Jul. 2004 (7 pages).
Schmidt et al., "Flexible Information Discovery in Decentralized Distributed Systems", *The Applied Software Systems Laboratory, Department of Electrical and Computer Engineering*, Rutgers University, Proceedings of the 12th IEEE International Symposium on High Performance Distributed Computing (HPDC'03) (10 pages).
Timmis, et al., "An Overview of Artificial Immune Systems", Computation in Cells and Tissues: Perspectives and Tools for Thought, Natural Computation Series, Springer (37 pages).
Bakhouya et al., "A Middleware for Large Scale Networks Inspired by the Immune System", Universit'e de Technologie de Belfort-Montbeliard, 90000 Belfort, France, Proceedings of the International Parallel and Distributed Processing Symposium (IPDPS.02) (5 pages), 2002.
Kunniyur, Srisankar S., "AntiECN Marking: A Marking Scheme for High Bandwidth Delay Connections", Department of Electrical and Systems Engineering, University of 2003, ICC '03, IEEE International Conference on 2003. (12 pgs.).
Satoh, D. et al., "Single PCN Threshold Marking by using PCN baseline encoding for both admission and termination controls", PCN Working Group, Internet-Draft, Mar. 9, 2009 (36 pgs.).
Kuhlewind, M. and Briscoe, B., "Chirping for Congestion Control—Implementation Feasibility", Proceedings of PFLDNeT'10, 2010—ikr.uni-stuttgart.de (7 pgs.).
Clark, David D. and Fan, Wenjia, "Explicit Allocation of Best-Effort Packet Delivery Service", IEEE/ACM Transactions on Networking, vol. 6, No. 4, Aug. 1998 (12 pgs.).
Hu, N. and Steenkiste, P., "Improving TCP Startup Performance using Active Measurements: Algorithm and Evaluation", Proceedings of the $11^{th}$ IEEE International Conference on Network Protocols (ICNP'03), 2003 (12 pgs.).
Leung, K. and Yeung, K. L., "TCP-Swift: An End-Host Enhancement Scheme for TCP over Satellite IP Networks", Department of Electrical and Electronic Engineering, The University of Hong Kong, Hong Kong, 2004 IEEE (5 pgs.).
Cisco DWRED "Distributed Weighted Random Early Detection" (18 pgs.) downloaded Dec. 30, 2015; http://www.cisco.com/univered/cc/td/doc/product/software/ios111/cc111/wred.htm.
Ha, S. and Rhee, I., "Hybrid Slow Start for High-Bandwidth and Long-Distance Networks", Dept of Computer Science, North Carolina State University, Proceedings of PFLDnet, 2008 (6 pgs.).
Padmanabhan, V. N. and Katz, R. H., "TCP Fast Start: A Technique for Speeding Up Web Transfers", Department of Electrical Engi-

(56) References Cited

OTHER PUBLICATIONS neering and Computer Sciences, University of California at Berkeley, Berkely, CA, In Proc. IEEE Globecom '98 Internet Mini-Conference, Sydney, Australia, Nov. 1998 (5 pgs.).
Floyd, S. et al., "Quick-Start for TCP and IP", Network Working Group, Nokia Research Center, Jan. 2007 (83 pgs.).
Akyildiz, Ian F. et al., "TCP-Peach: A New Congestion Control Scheme for Satellite IP Networks", IEEE/ACM Transactions on Networking (TON), vol. 9, Issue 3, Jun. 2001 (15 pgs.).
Singh, M. et al., "Utilizing spare network bandwidth to improve TCP performance", Cornell University, Poster in Proc. of ACM SIGCOMM, 2005 (1 pg.).
Venkataraman, V. et al., "A priority-layered approach to transport for high bandwidth-delay product networks", CoNEXT '08 Proceedings of the 2008 ACM CoNEXT Conference, Article No. 14, 2008 (6 pgs.).
Md Ehtesamul Haque and Md Humayun Kabir, "TCP Congestion control in Heterogeneous Network", Department of Computer Science and Engineering, Bangladesh University of Engineering and Technology, Bangladesh, Aug. 20, 2007 (6 pgs.).
WAN optimization From Wikipedia, the free encyclopedia, http://en.wikipedia.org/w/index.php?title=WAN_optimization&printable=yes, retrieved from the internet Feb. 5, 2013 (3 pgs).
Congestion Avoidance Overview, Quality of Service Solutions Configuration Guide, QC-76, IOS Cisco—2013 (8 pgs.).
WAN optimization techniques, http://searchenterprisewan.techtarget.com/feature/WAN-optimization-techniques, retrieved from the internet on Feb. 5, 2013 (4 pgs.).
Briscoe, B. et al., "More Accurate ECN Feedback in TCP", Transport Area Working Group, Internet-Draft University of Stuttgart, Jul. 2, 2014 (55 pgs.).
Lin, D. and Morris, R., "Dynamics of Random Early Detection", Division of Engineering and Applied Sciences, Harvard University, Cambridge, MA, ACM SIGCOMM Computer Communication Review, 1997 (11 pgs.).
Ramakrishnan, K. et al., "The Addition of Explicit Congestion Notification (ECN) to IP", Memo, Network Working Group, Sep. 2001 (63 pgs.).
Andrikopoulos, I. et al., "Providing Rate Guarantees for Internet Application Traffic Across ATM Networks", Centre for Communication Systems Research (CCSR), University of Surrey, Communications Surveys, IEEE, vol. 2, Issue 3, 1999 (14 pgs.).
Xia, Y. et al., "One More Bit Is Enough", SIGCOMM'05, Aug. 22-26, 2005, Philadelphia, Pennsylvania, USA (12 pgs.).
Sathiaseelan, A. et al., "Enhancing TCP to Support Rate-Limited Traffic", CSWS'12, Proceedings of the 2012 ACM workshop on Capacity sharing, 2012 (6 pgs.).
Scharf, M. et al., "Speeding up the 3D Web: A Case for Fast Startup Congestion Control", Proceedings of PFLDNeT, 2009 (6 pgs.).

* cited by examiner

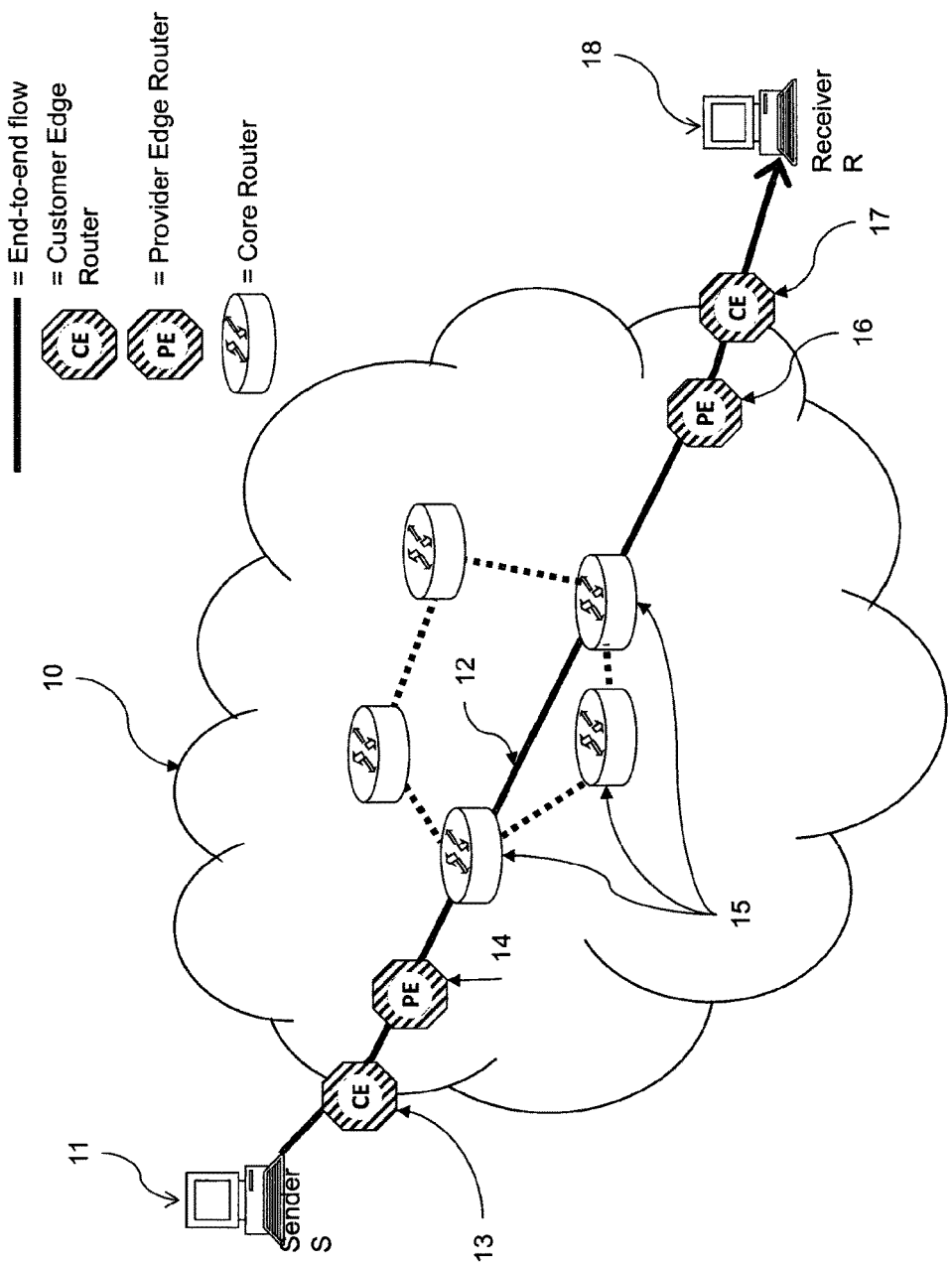
Figure 1 - Schematic of a Typical Network

| 0 | | | | | 1 | | | | | 2 | | | | | 3 | |
|---|---|---|---|---|---|---|---|---|---|---|---|---|---|---|---|---|
| 0 1 2 3 | 4 5 6 7 | 8 9 0 1 | 2 3 4 5 | 6 7 8 9 | 0 1 2 3 | 4 5 6 7 | 8 9 0 1 |

| Version | IHL | Diffserv | ECN | Total Length |||
|---|---|---|---|---|---|---|
| Identification ||| Flags | Offset ||
| Time to Live || Protocol | Header Checksum ||||
| Source Address |||||||
| Destination Address |||||||
| Options |||||| Padding |

Figure 2 - IPv4 header

| 0 | | | | | 1 | | | | | 2 | | | | | 3 | |
|---|---|---|---|---|---|---|---|---|---|---|---|---|---|---|---|---|
| 0 1 2 3 | 4 5 6 7 | 8 9 0 1 | 2 3 4 5 | 6 7 8 9 | 0 1 2 3 | 4 5 6 7 | 8 9 0 1 |

| Version | Diffserv | ECN | Flow Label |
|---|---|---|---|
| Payload Length || Next Header | Hop Limit |
| Source Address ||||
| Destination Address ||||

Figure 3 – IPv6 header

| Codepoint meaning | Codepoint name | ECN field | |
|---|---|---|---|
| Not ECN-capable transport | Not-ECT | 0 | 0 |
| ECN-capable transport | ECT(1) | 0 | 1 |
| ECN-capable transport | ECT(0) | 1 | 0 |
| Congestion Experienced | CE | 1 | 1 |

Figure 4– Definition of the Explicit Congestion Notification (ECN) field in either IPv4 or IPv6

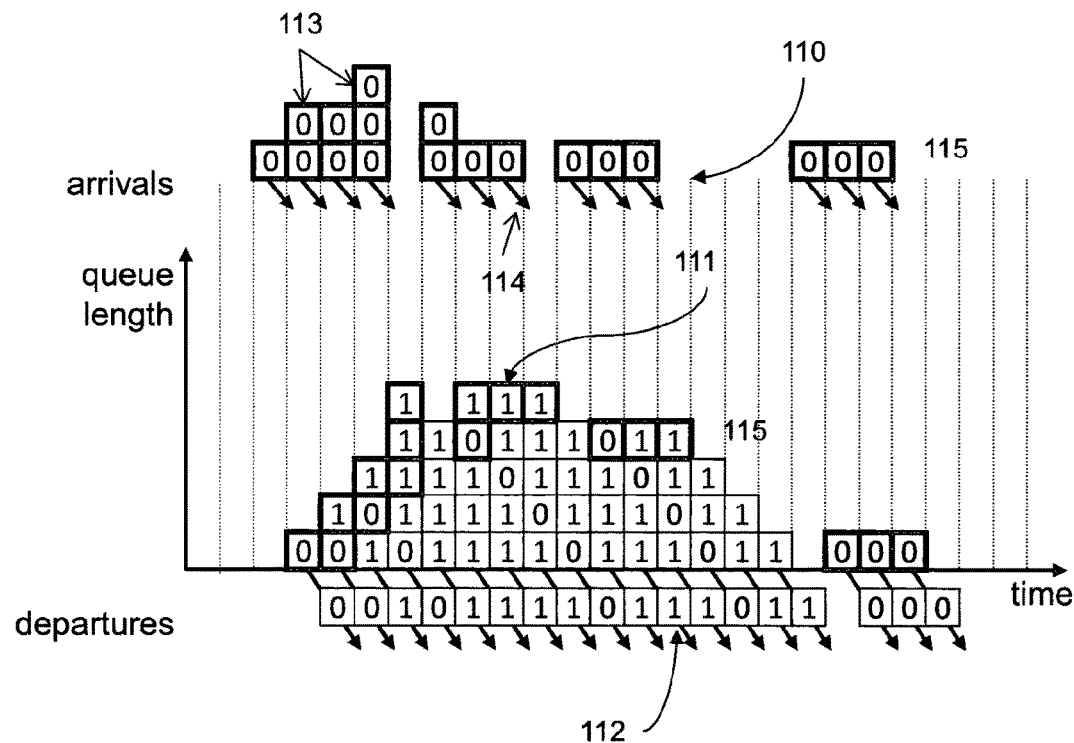
Figure 5– The Unqueuable ECN Marking Process as Queue Length Evolves

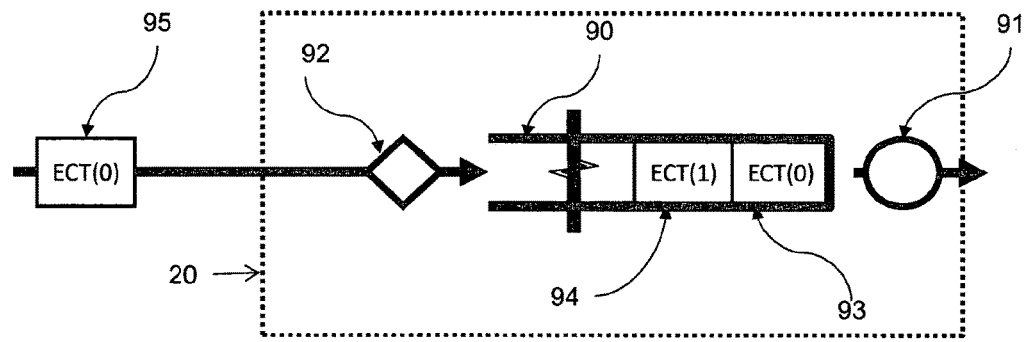
Figure 6– A Buffer with a single-Unmarked-Packet Queue
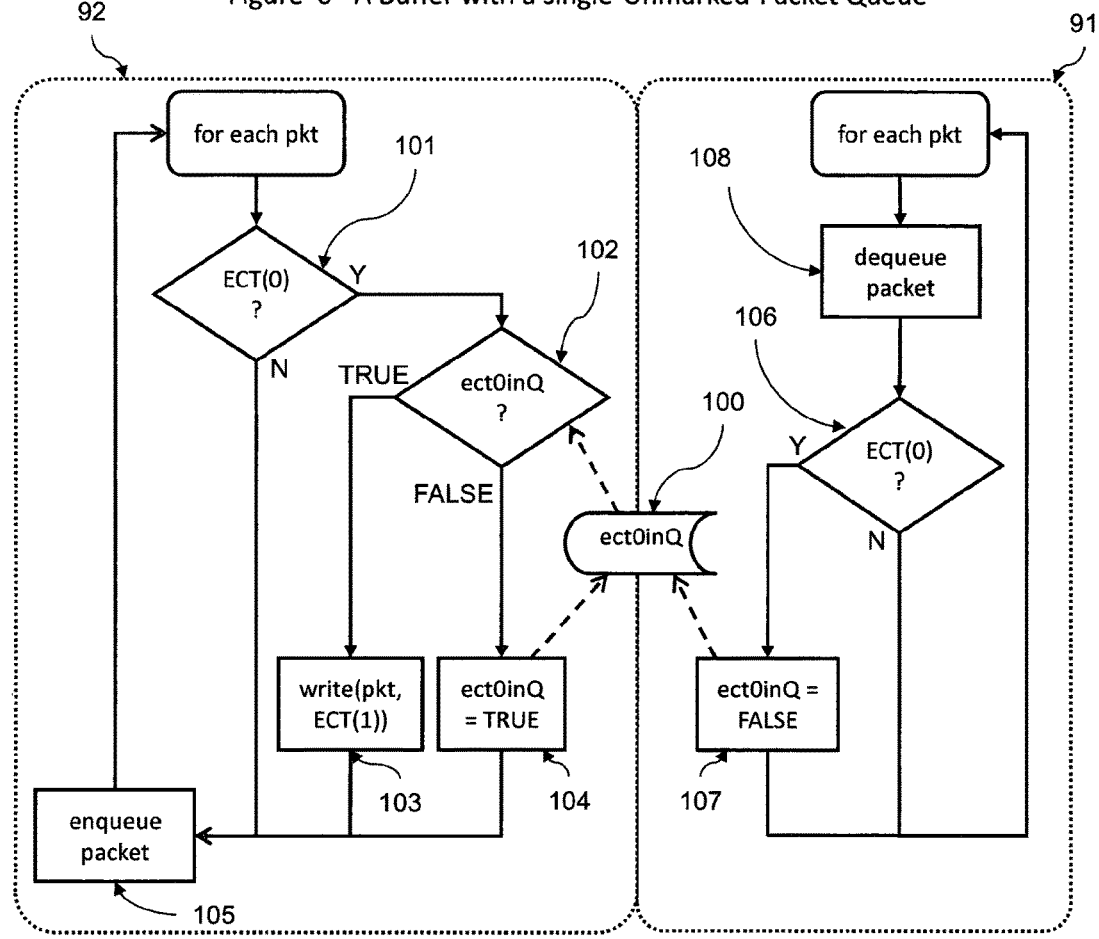
Figure 7 – Flow Diagram showing the Relevant Parts of the Enqueuing and Dequeuing Algorithms of the Unqueuable ECN Marking Algorithm

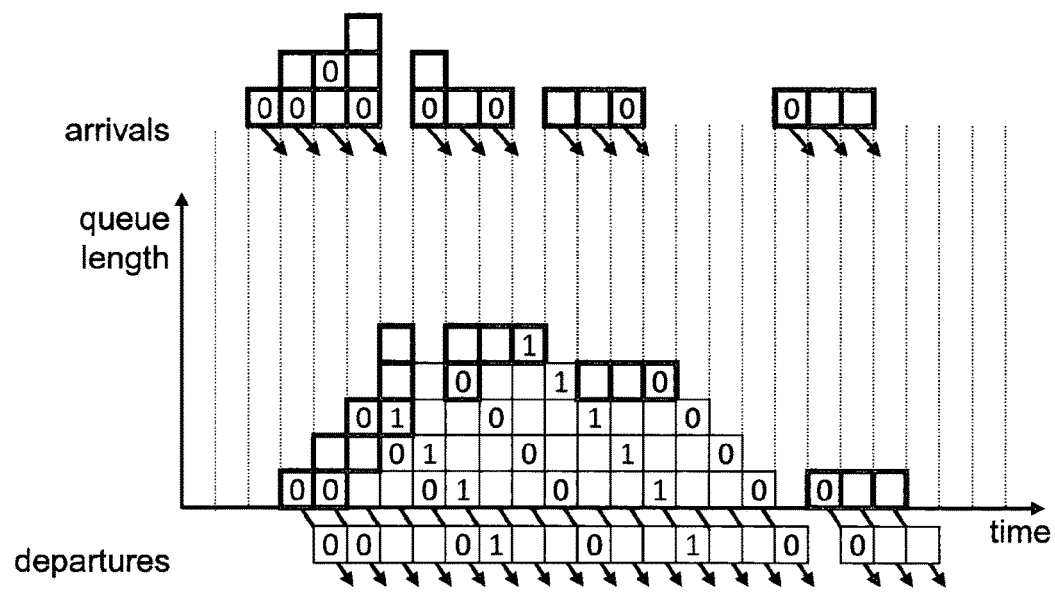
Figure 8– Unqueuable ECN Marking mixed with Non-ECN-Capable packets

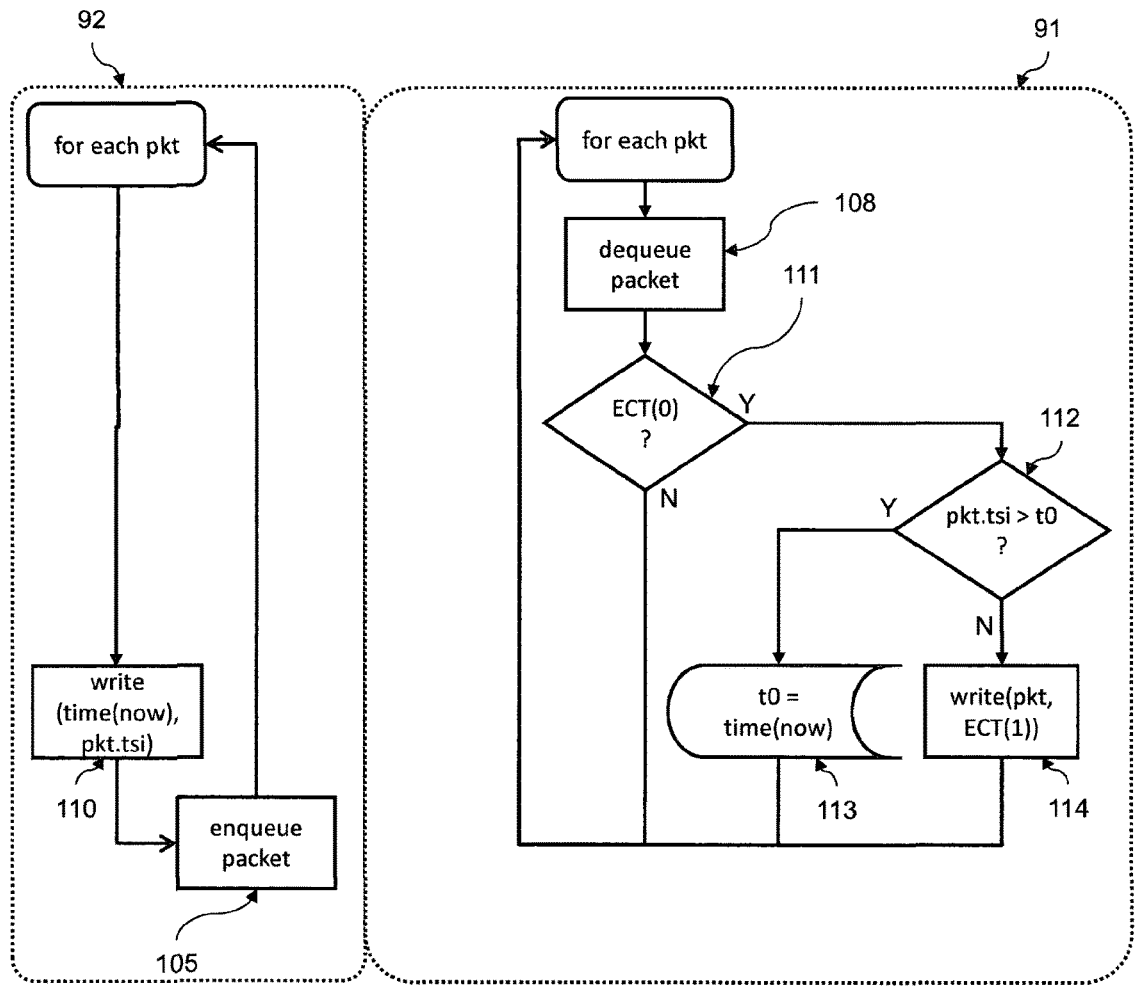
Figure 9 – Flow Diagram showing the Relevant Parts of the Enqueuing and Dequeuing Algorithms of an Alternative Unqueuable ECN Marking Algorithm

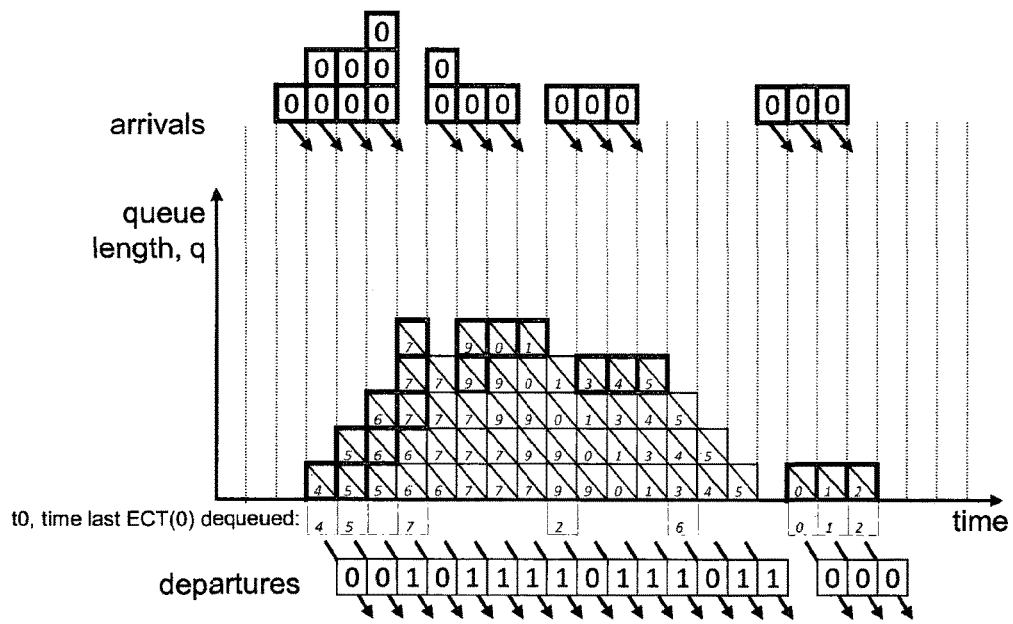
Figure 10 – An Alternative Unqueuable ECN Marking Process as Queue Length Evolves

RE-MARKING OF PACKETS FOR QUEUE CONTROL

This application is the U.S. national phase of International Application No. PCT/GB2014/000121 filed 27 Mar. 2014 which designated the U.S. and claims priority to EP Patent Application No. 13250049.7 filed 28 Mar. 2013 and GB Patent Application No. 1307077.6 filed 18 Apr. 2013, the entire contents of each of which are hereby incorporated by reference.

FIELD OF INVENTION

The present invention describes a way of re-marking packets in order to indicate the length of a queue at a buffer in a packet network and specifically it relates to a method and apparatus for transmission rate adaptation based on the indicated queue length.

BACKGROUND TO THE INVENTION

A data source faces a dilemma whenever it has little or no information about how much capacity is available, but it needs to send data as fast as possible without causing undue congestion. A data source faces this dilemma every time it starts a new data flow, every time it re-starts after an idle period, and every time another flow finishes that has been sharing the same capacity.

The family of congestion control algorithms that have been proposed for TCP combine two forms of operation: one dependent on congestion feedback (closed-loop control), the other at times when there is no feedback (open-loop control). On the current Internet, open loop control has to be used at the start or re-start of a flow or at the end of a competing flow, when the sender has little or no information on how much capacity is available.

For instance, a large majority of TCP algorithms uses the same 'slow-start' algorithm to exponentially increase the sending rate, probing for more capacity by doubling the sending rate every round trip, until the receiver feeds back that it has detected a loss as the first signal of congestion. The sender receives this feedback one round trip time after its sending rate exceeded available capacity. By the time it receives this signal it will already be sending more than twice as fast as the available capacity.

A concept called the congestion window is used within the TCP algorithm to control its rate. The window is the amount of data that can be sent in excess of the data that has been acknowledged. With little or no knowledge of the available capacity (open-loop) it is difficult to argue whether one congestion window is better than another—any behaviour could be safe in some circumstances and unsafe in others. Internet standards say a flow should start with a window of no more than 4380B (3 full-sized packets over Ethernet), and a window of 10 packets is currently being experimented with. Numbers like these are set by convention to control a flow's behaviour while it has no better information about actual available capacity (open-loop control). Similarly, there is no particular reason why TCP doubles its window every round trip during its start-up phase. Doubling certainly matches the halving that another part of the TCP algorithm does during its closed-loop (or 'congestion avoidance') phase. However, the choice of the number two for doubling and halving was fairly arbitrary.

This doubling does not always interact well with non-TCP traffic. Consider the case of a low-rate (e.g. 64 kb/s) constant-bit-rate voice flow in progress over an otherwise empty 1 Gb/s link. Further imagine that a large TCP flow starts on the same link with an initial congestion window of ten 1500B packets and a round trip time of 200 ms. To discover how much capacity is available, the flow keeps doubling its window every round trip until, after nearly eleven round trips, its window is 16,666 packets per round (1 Gb/s). In the next round it will double to 2 Gb/s before it gets the first feedback detecting drops that imply that it exceeded available capacity a round trip earlier. About 50% of the packets in this next round (16,666 packets) will be dropped. This huge loss of packets is the best case scenario if the buffer is correctly sized.

In this example TCP has already taken 11 round trip times, over 2 seconds in this case, to find its correct operating rate. Further, when TCP drops such a large number of packets, it can take a long time to recover, sometimes leading to a black-out of many more seconds (100 seconds has been reported [Ha08] due to long time-outs or the time it takes for the host to free-up large numbers of buffers). In the process, the voice flow is also likely to black-out for at least 200 ms and often much longer, due to at least 50% of the voice packets being dropped over this period.

This shows there are two problems during flow-startup: i) a long time before a flow stabilises on the correct rate for the available capacity and ii) a very large amount of loss damage to itself and to other flows before a newly starting flow discovers it has increased its rate beyond the available capacity (overshoot).

These problems do not only arise when a new flow starts up. A very similar situation occurs when a flow has been idle for a time, then re-starts. When a flow restarts after idling, it is not sufficient for it to remember what the available capacity was when it was last active, because in the meantime other traffic might have started to use the same capacity, or flows that were using the same capacity might have finished, leaving much more available capacity than earlier.

These problems do not even only arise when a flow starts or restarts. If two flows are sharing the same capacity they will continually slowly try to use more capacity, deliberately causing regular buffer overflows and losses. When either flow detects a loss, it responds by slowing down. The outcome of all the increases and all the decreases leads each flow to consume a proportion of the capacity on average. However, when one flow finishes, the other flow is never told explicitly that more capacity is available. It merely continues to increase slowly for what can be a very long time before it eventually consumes all the capacity the other flow freed up.

Recently, new TCP algorithms such as Cubic TCP have been designed that seek out newly available capacity more quickly. However, the faster they find new capacity, the more they overshoot between reaching the new limit of available capacity and detecting that they have reached it a round trip later.

As the capacity of Internet links increases, and the bit-rates that flows use increase, this open-loop control dilemma between increasing too slowly and overshooting too much gets progressively more serious.

A number of different methods for signaling congestion in packet networks i.e. that queues are building up, are known in the prior art, for example active queue management (AQM) techniques (e.g. RED, REM, PI, PIE, CoDel) can be configured to drop a proportion of packets when it is detected that a queue is starting to grow but before the queue is full. All AQM algorithms drop more packets as the queue grows longer.

An active queue management algorithm can be arranged to discard a greater proportion of traffic marked with a lower class-of-service, or marked as out-of-contract. For instance, weighted random early detection [WRED] determines whether to drop an arriving packet using the RED AQM algorithm but the parameters used for the algorithm depend on the class of service marked on each arriving packet.

Explicit Congestion Notification (ECN) [RFC3168] conveys congestion signals in TCP/IP networks by means of a two-bit ECN field in the IP header, whether in IPv4 (FIG. 2) or IPv6 (FIG. 3). Prior to the introduction of ECN, these two bits were present in both types of IP header, but always set to zero. Therefore, if these bits are both zero, a queue management process assumes that the packet comes from a transport protocol on the end-systems that will not understand the ECN protocol so it only uses drop, not ECN, to signal congestion.

The meaning of all four combinations of the two ECN bits in IPv4 or IPv6 is shown in FIG. 4. If either bit is one, it tells a queue management process that the packet has come from an ECN-capable transport (ECT), i.e. both the sender and receiver understand ECN marking, as well as drop, as a signal of congestion.

When a queue management process detects congestion, for packets with a non-zero ECN field, it sets the ECN field to the Congestion Experienced (CE) codepoint. On receipt of such a marked packet, a TCP receiver sets the Echo Congestion Experienced (ECE) flag in the TCP header of packets it sends to acknowledge the data packets it has received. A standard TCP source interprets ECE feedback as if the packet has been dropped, at least for the purpose of its rate control. But of course, it does not have to retransmit the ECN marked packet.

Drop and congestion signals are not mutually exclusive signals, and flows that enable ECN have the potential to detect and respond to both signals.

The ECN standard [RFC3168] deliberately assigns the same meaning to both the ECN codepoints with one bit set (01 and 10). They both mean that the transport is ECN-capable (ECT), and if they need to be distinguished they are termed ECT(1) and ECT(0) respectively. The intention was to allow scope for innovative new ways to distinguish between these fields to be proposed in future.

There are some known alternative uses for the two ECN-capable transport (ECT) codepoints.

One idea has been to use the ECT(1) value to signal an intermediate level of congestion between uncongested (ECT (0)) and congested (CE). This idea has been standardised in one variant of an approach termed pre-congestion notification (PCN [RFC5670]). PCN uses a virtual queue, which is not actually a queue; rather it is a number that represents the length of queue that would have formed if the buffer were drained more slowly than the real buffer drains. One variant of PCN uses two virtual queues one configured to drain at a slower rate than the other. When the slower virtual queue fills, it marks packets with the ECT(1) codepoint and when the faster virtual queue fills it marks packets with the CE codepoint. The PCN approach is not standardised to be used as a signal to end-systems, only within the network.

AQM and ECN are not exclusive to IP-aware devices. Many non-IP devices use AQM to drop packets before the queue fills the buffer and some protocols layered below IP include the facility to signal congestion explicitly instead of dropping packets (e.g. MPLS [RFC5129]). Such lower-layer protocols typically encapsulate an IP packet. Taking the case of MPLS as an example, when the inner IP packet is decapsulated at the egress edge of an MPLS subnet, any ECN marking on the outer MPLS header is propagated into the inner IP header to be forwarded onward to its destination.

The encoding of ECN in the MPLS header is flexible enough to be able to define more than one level of severity for congestion notification, at least within the constraints of the size of the MPLS header. Then, for instance, the two levels of PCN marking can be encoded.

In "Single PCN threshold marking by using PCN baseline encoding for both admission and termination controls", appendix D, by D. Satoh et al [1], a mechanism is described for marking the proportion of packets that represents the instantaneous utilisation of a logical link. Utilisation of the logical link is signaled by marking the ECN field of every packet that arrives when the virtual queue is non-empty. The proportion of bits in marked packets relative to all bits then represents instantaneous utilisation, but the representation is only precise for a Poisson distribution of inter-arrival times.

There have been other proposals from the research community for a network node to signal an early warning of impending congestion to end-systems as well signaling actual queue growth, in order to address the open-loop control problem at the start of a new data flow. For instance VCP in "One more bit is enough" by Yong Xia et al [2], uses the ECT(1) codepoint of the ECN field to signal when utilisation of a link has exceeded a set threshold, in a similar way to PCN.

In "AntiECN Marking: A Marking Scheme for High Bandwidth Delay Connections", S. Kunniyur [3], each packet carries a bit called the Anti-ECN bit in its header. The bit is initially set to zero. Each router along the packet's route checks to see if it can allow the flow to increase its sending rate by determining whether the packet has arrived at an empty virtual queue. If so, the router sets the bit to one. If on arrival the virtual queue is non-empty, it sets the bit to zero. The receiver then echoes the bit back to the sender using the ACK packet. If the bit is set to one, the sender increases its congestion window and hence its rate.

Patent application US2002009771 [6] discloses a traffic shaping and scheduling function for the release of packets from a queue. A packet eligible for transmission is provided with a tag, created for the packet, which tag may operate as a criterion for sorting the packet in a binary tree of tags. The tag is one of the determinants of the order in which several packets are selected for transmission, however, the tag is not used for indicating any kind of congestion at the node.

SUMMARY OF INVENTION

According to a first aspect of the present invention there is provided a method for handling packets at a node in a packet network comprising: receiving at a queue a packet carrying a status tag set to a first status value; checking if any packet already in the queue at the time of arrival of said packet has upon leaving the queue a tag set to the first status value; and if so changing the tag status value of the received packet to a different status value.

By changing the value of the status tag if there is already a packet in the queue which still has said first status value when leaving the queue, an explicit queue length at the node can be determined from a sequence of status tags irrespective of which unit the node measures the queue length in. Further, end-systems receiving a sequence of status tags are able to rapidly detect the very first sign of queue growth from said sequence.

According to a second aspect of the present invention there is provided a node for handling packets in a packet network comprising: an interface arranged in operation to receive and enqueue a packet having a status tag set to a first status value; and a module arranged in operation to check if any packet already in the queue at the time of arrival of said packet has upon leaving the queue a tag set to the same first status value; and if so to change the tag status value of the received packet to a different status value.

According to a third aspect of the invention there is provided a method for estimating a length of a queue of packets awaiting handling at a network node, which network node is arranged to operate in accordance with the method of the above first aspect of the invention for example, said method comprising: receiving at another node a sequence of tag status values associated with packets which have been routed via said network node, where said tag status value is set to either a first or a different status value; and estimating the length of the queue from said sequence of tag status values.

By estimating the queue length from the sequence of received status tags, a sender node will be able to tell if it has been sending out packets too slowly or it will be able to quantify how much faster its transmission rate has been than the available capacity and adapting its packet transmission rate accordingly. Further, the sender node will be aware of an increasing queue length at an early stage, long before there is actual congestion, and hence react faster to any problems.

Preferably, a receiving node will typically reflect the status tags it receives back to a sender node as encoded feedback messages, so that the sender can determine the queue length from the spacing between packets carrying the first status value. Alternatively the receiving node may determine this spacing itself, and continually derive the queue length. Then the receiving node may continually feed a value representing this queue length back to the sender, or the receiving node may even determine a new rate for the sender to use and feed a value representing this rate back to the sender.

According to a fourth aspect of the invention there is provided a node in a packet network arranged in operation to estimate a length of a queue of packets awaiting handling at a network node, which network node is adapted to operate according to the above second aspect of the invention for example, said node comprising: an interface arranged in operation to receive a sequence of tag status values associated with packets which have been routed via said network node, where said tag status value is set is to either a first or a different status value; and a module arranged in operation to estimate the length of the queue from said sequence of tag status values.

Embodiments of the invention will now be described, by way of example, with reference to the accompanying drawings in which:

FIG. 1 shows a schematic diagram of a typical packet network.

FIG. 2 shows an IPv4 packet header.

FIG. 3 shows an IPv6 packet header.

FIG. 4 shows the current definition of the Explicit Congestion Notification (ECN) field in either IPv4 or IPv6.

FIG. 5 shows an exemplary diagram of the unqueuable ECN marking process as queue length evolves.

FIG. 6 shows a buffer with a single unmarked packet queue.

FIG. 7 shows a flow diagram of the relevant parts of the enqueuing and dequeueing algorithms of the unqueueable ECN marking algorithm.

FIG. 8 shows unqueueable ECN marking mixed with non-ECN capable packets.

FIG. 9 shows a flow diagram of the relevant parts of the enqueuing and dequeueing algorithms of an alternative unqueueable ECN marking algorithm.

FIG. 10 shows an exemplary diagram of an alternative unqueuable ECN marking process as queue length evolves.

DETAILED DESCRIPTION OF INVENTION

Figure 11A:
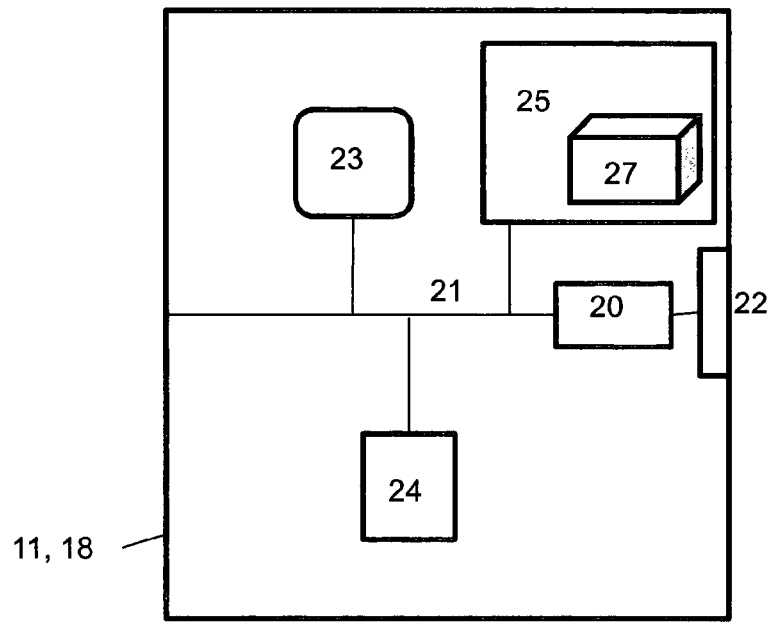
FIG. 11a shows an exemplary embodiment of a sender/receiver node.

FIG. 1 shows a schematic diagram of a typical packet network (10). A sender node (11) sends data packets along path (12) towards receiver (18). A sequence of routers forward the data packets along the path. The sender node (11) forwards them to a customer edge (CE) router (13), which in turn forwards them to a provider edge (PE) router (14). Other senders (not shown) will typically be connected to the CE router and other CE routers (not shown) will typically be connected to the PE router. The PE router forwards the data packets to a core router, which in turn may forward them via one or more core routers towards a second PE router (16), which forwards them to the receiver node (18) via another CE router (17). It will be understood that the path from a sender node to a receiver node may pass through different numbers of routers to those depicted in FIG. 1.

With reference to FIG. 11a sender/receiver node (11, 18) comprises an interface (22) for transmitting and receiving packets to/from network (10), a bus (21), a processor CPU (23), at least one memory (24), at least one store (25) for storing one or more program modules (27) and optionally a buffer (20). The program module (27) will when loaded into memory (24) and executed by processor (23) perform the queue length estimating method later described.

Figure 11B:
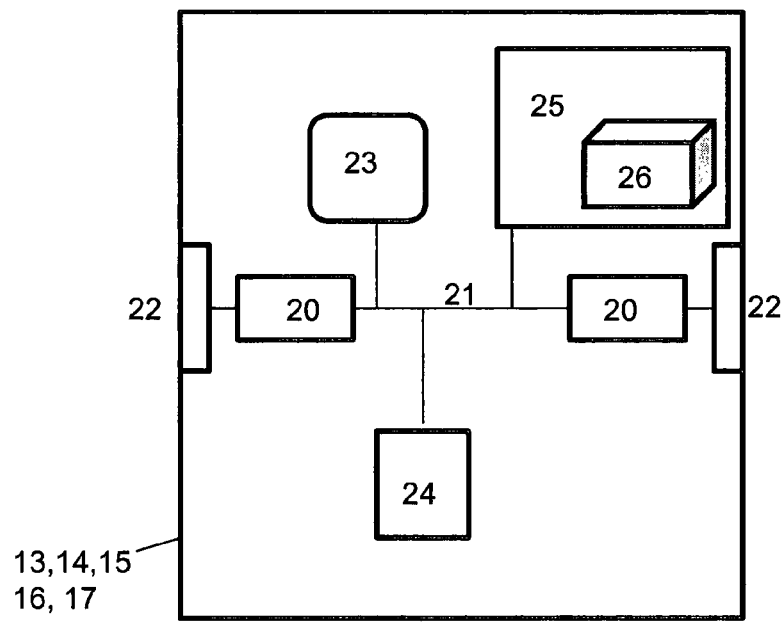
FIG. 11b shows an exemplary embodiment of a router node.

With reference to FIG. 11b each router (13, 14, 15, 16, 17) comprises a processor CPU (23), at least one memory (24), at least one store (25) for storing one or more program modules (26) and at least one buffer (20) for each outgoing interface (22) and a bus (21). The one or more program modules (26) will, when loaded into memory (24) and executed by processor (23), perform the packet handling methods later described.

FIG. 6 depicts one of these buffers (20) with a few packets (93, 94) which have arrived in a certain order. In practice selected information from the packet headers may be buffered separately from the actual packets, but only a single buffer is shown for simplicity. In prior classifying and scheduling stages, the router may have determined which packets to queue in this buffer. The buffer and its management consists of a packet store (90), a dequeuing function module (91) that forwards packets to the line and an enqueuing function module (92) that enqueues arriving data packets.

The enqueuing and dequeuing function modules may be implemented on the same network interface card. Alternatively, in distributed machine architectures they may be implemented on separate cards while sharing access to common control information about the distributed buffer memory. In such a case the components of the buffer (20) will be associated together logically rather than physically.

Although the term 'router' has been used for all the network nodes, this is not intended to preclude non-IP-aware nodes, e.g. Ethernet switches or MPLS switches, from implementing the invention in their buffers. Similarly, it does not preclude functions with a buffer but no routing or switching from implementing the invention, e.g. end-systems, firewalls or network address translators.

The unqueueable ECN marking approach will first be described with the aid of FIG. 5 for the simplest case of a single bottleneck queue in which all arriving packets are the same size and come from data sources that are all ECN-capable.

FIG. 5 shows in a graph the queue length as a function of time for arriving/departing packets (113). Time is divided into timeslots (110) along the horizontal axis, with packets (113) illustrated as little rectangles. During each timeslot one packet is forwarded by the dequeueing function module (91) from the buffer to the line, represented by the stream (112) of single packets leaving the system in the direction of the diagonal arrows from under the horizontal axis. There is no intention to imply that in practice the router operates in discrete timeslotted steps the size of individual packets; this is merely a way to simplify explanation of the process. Zero, one or more packets (113) may arrive during a timeslot (110), represented by the stack of arriving packets shown along the top of the diagram, with diagonal arrows (114) showing that the whole arriving stack of packets joins the queue during the next timeslot (110). The length of the queue in each timeslot is shown by the height of the stack of packets in the body of the graph. The packets that have just been added into the queue within the current timeslot are shown with thicker borders.

The character (115) (or lack of character) within each packet (113) in FIG. 5 represents the value of the ECN codepoint in that packet, using the abbreviated forms in the legend at the bottom of the figure. In this initial simple case, all arriving packets come from senders that have set the ECN field to ECT(0), which is the standard ECN behaviour.

The choice of these particular codepoints to encode queue length signals is not intended to preclude other similar encodings. It is merely used to illustrate a concrete example of the invention that has been designed to be possible to deploy incrementally in the current Internet. Other encodings are equally valid, particularly where constraints of deployment do not apply.

When a packet arrives with the ECT(0) codepoint, the enqueuing algorithm only allows it to keep the ECT(0) marking if there are no other packets in the queue with the ECT(0) marking. In the case of the packet labelled (111), there is an ECT(0) packet already in the middle of the queue. Therefore, the newly arriving packet is re-marked to the ECT(1) codepoint. As time progresses one packet leaves the queue in each timeslot, therefore any packet appears to progress diagonally down and to the right of the graph, until it leaves the queue in the stream (112).

Once an unmarked packet (ECT(0)) leaves the queue, the next packet to arrive can be left unmarked. This is why diagonal stripes of zeroes can be seen in FIG. 5, spaced apart by the length of the queue when the new ECT(0) packet arrived. Therefore the spacing between ECT(0) packets in the stream of packets (112) leaving the queue represents the length of the queue at the time the later ECT(0) packet originally arrived.

This spacing can be measured in packets, in bytes or in time. In a more realistic scenario, arriving packets would be different sizes. The packet marking process would be no different to that already described, in that each arriving packet will still be re-marked to the ECT(1) codepoint if there were a packet marked ECT(0) already in the queue. As packets leave the buffer, the number of transmitted bytes between the start of one ECT(0) packet and the start of the previous ECT(0) packet would then represent the length of the queue in bytes at the instant that the second of the two packets arrived. Similarly, the duration between one ECT(0) packet starting to be dequeued and the previous ECT(0) packet starting to be dequeued would represent the queuing delay experienced by the second ECT(0) packet.

One way to implement the unqueueable ECN marking algorithm is described in the following using pseudocode and the diagrams in FIGS. 6 and 7. An alternative algorithm is also described later, nonetheless it should be understood that these two example algorithms do not preclude other similar ways of achieving the same outcome.

The algorithm consists of two functions that are part of the enqueue module (92) and the dequeue (91) module. The two functions share a binary variable ect0inQ (100) used to communicate between the two, that is set as TRUE if there is a packet carrying the ECT(0) codepoint in the queue. It is initialised as follows.

Boolean ect0inQ=FALSE

FIG. 6 illustrates the packet store (90) already containing two packets, the first (93) with the ECT(0) marking and the second (94) with the ECT(1) marking.

As each arriving packet is enqueued, the following algorithm within the enqueue function module (92) allows no more than one packet in the queue with an ECN field of ECT(0):

```
enqueue(packet) {
    foreach packet {
        if (read_ECN(packet) == ECT0) {
            if (ect0inQ) {
                write(packet, ECT1)
            } else {
                ect0inQ = TRUE
            }
        }
        % code to enqueue the packet here
    }
}
```

As each packet is dequeued, the following algorithm is run to maintain the ect0inQ variable that tracks whether there is a packet in the queue marked ECT(0):

```
dequeue(packet) {
    foreach packet {
        % code to dequeue the packet here
        if (read_ECN(packet) == ECT0) {
            ect0inQ = FALSE
        }
    }
}
```

As an example, consider that the queue was empty when the first packet (93) arrived at the enqueuing function module (92) carrying the ECT(0) marking. At stage (101) only packets that arrive carrying the ECT(0) marking are passed to the unqueueable ECN marking algorithm. This packet does so it passes to stage (102) which tests the shared variable ect0inQ. This will have been set to FALSE either by the initialisation step above, or by an earlier execution of the dequeue loop when the last ECT(0) packet left the queue. Therefore, execution passes to stage (104) where the ECT(0) codepoint is left unchanged and ect0inQ is set to TRUE to reflect the fact that the single ECT(0) packet permitted in the queue is now present. Then execution passes to stage (105) where the usual enqueuing machinery is executed to add the packet to the buffer's memory structure.

As a different example, consider the third packet (95) to arrive at the enqueuing function module (92) carrying the ECT(0) marking, while the first packet has still not been completely forwarded to the line. At stage (101) the newly arriving packet is tested for whether it carries the ECT(0) marking, which it does so it passes to stage (102) which tests the shared variable ect0inQ. Because the ECT(0) packet (93) is still sitting at the head of the queue, ect0inQ is still TRUE. So this time execution passes to stage (103) where the ECN field is re-marked to ECT(1). Then execution again passes to stage (105) where the usual enqueuing machinery is executed to add the packet to the buffer's memory structure.

When packet (93) has finally finished being forwarded to the line through the normal dequeuing processes (108), the module of the dequeue function (91) is called that manages unqueuable ECN marking. If the packet that is about to finish being dequeued carries the ECT(0) marking, as packet (93) does, stage (106) passes execution to stage (107) that sets the shared ect0inQ flag to FALSE, indicating that there is no longer an ECT(0) packet in the queue. This will allow a new ECT(0) packet into the queue by the next execution of stage (102) in the enqueuing function, because it will pass to stage (104) not (103), as has already been explained.

If, on the other hand, the packet that is about to finish being dequeued after stage (108) does not carry the ECT(0) marking, then stage (106) will do nothing other than pass execution straight back to the outer dequeue function to process the next packet.

This algorithm design is an example of known mutual exclusion algorithms such that the implementations of the enqueue (92) and dequeue (91) parts can be executed on independent parallel processors, because there is no possibility that any order of events or race conditions can ever allow two ECT(0) packets into the queue at the same time.

As has been pointed out with reference to FIG. 5, the spacing between unmarked (ECT(0)) packets in the outgoing packet stream (112) represents the queue length at the instant the later ECT(0) packet arrived at the queue. Referring to FIG. 1, for the data sender (11) to be able to continuously monitor the queue length, the receiving node (18) must feed back to the sender (11) an encoding of how many of each type of ECN codepoint it has received in a data flow.

Alternatively the receiving node may determine this spacing itself, and continually derive the queue length. Then the receiving node may continually feed a value representing this queue length back to the sender, or the receiving node may even determine a new rate for the sender to use and feed a value representing this rate back to the sender.

Nonetheless, it will be most straightforward for the receiver to simply reflect an encoding of the values of the ECN field that it receives, because this feedback is already provided by newer end-to-end transport protocols, and it is being added to older ones such as TCP.

Specifically, a proposal entitled "More Accurate ECN Feedback in TCP" by M. Kühlewind and R. Scheffenegger [4] is before the Internet Engineering Task Force (IETF), for the TCP protocol to be modified so that the receiving node (18 in FIG. 1) feeds back to the sender (11) indications of how many of each type of ECN codepoint it has received in a data flow. Other more recent end-to-end transport protocols already provide for sufficient ECN feedback information, for example the base datagram congestion control protocol (DCCP [RFC4340]) and the recent modification to the real-time control protocol (RTCP) to add ECN capabilities [RFC6679].

Nonetheless, all the packets passing through the buffer into a link in the network need not originate at the same sender. For instance, referring to FIG. 1, although sender (11) is connected to the link between the CE router (13) and the (PE) router (14), other senders may also be connected to the CE router. Also, within sender (11), multiple independent processes may be sending data through this link. Therefore the packets in FIG. 5 may be divided into subsets, each belonging to different data flows between different sending and receiving processes.

It will now be shown that on average the unqueuable ECN marking scheme signals the queue length into each of these independent data flows, so that it is not merely useful when one data flow is alone on the link. The average measurement becomes more precise the more packets there are in any one data flow, so that short flows receive a rough estimate of the queue length, while larger flows develop a more accurate view of the evolving queue length. This is sufficiently useful, because a short flow can do limited damage to other flows if its estimate of the queue length is too large or too small, whereas a larger flow has the potential to cause much more harm to other flows if its measurement of queue length is significantly incorrect.

As an example, consider for simplicity that the queue of packets in FIG. 5 is a constant standing queue of 10 packets, so that every tenth packet in the stream departing from the buffer carries the ECT(0) codepoint while the every other nine carry ECT(1). Further consider that the stream of packets consists of two data flows, one that on average consumes 20% of the capacity of the link while the other consumes 80%. Assuming packets arrive randomly from each flow the first flow will pick up about 20% of the ECT(1) markings and 20% of the ECT(0) markings. Therefore, over a stream of 100 packets, as shown in the table below, on average 10 will carry ECT(0) and the first flow will see 20%×10=2 of them, while in total 90 will carry ECT(1) and the first flow will see 20%×90=18 of them. Therefore, on average, of the 20 packets in the first flow, 2 will carry ECT(0), so on average the first flow will correctly calculate that the queue is 20/2=10 packets long, even though it only receives 20% of the packets.

|  |  | ECT(0) 10% | ECT(1) 90% |
|---|---|---|---|
| All flows | 100% | 10 | 90 |
| Flow 1 | 20% | 2 | 18 |
| Flow 2 | 80% | 8 | 72 |

The unqueuable ECN marking scheme does not directly enable any one data source to determine its own contribution to the queue length as distinct from the total queue length. However, inference techniques would be possible to estimate this. For instance, by varying its own data rate and correlating its variation with changes in the aggregate queue length, a sender could determine the proportion of the queue that it was responsible for. Another possible heuristic would be to measure both the time and the number of its own bytes between ECT(0) codepoints. For instance, a queue of 10×1500B packets into an 80 Mb/s line should drain in (10×1500*8)b/80 Mb/s=1.5 ms. If a data source knew (through some other mechanism) that its bottleneck link was 80 Mb/s, and if it measured that an ECT(0) packet appeared every ten 1500B packets but the time between them was 7.5 ms not 1.5 ms, it could estimate that it was contributing to 1.5/7.5=20% of the queue.

A further scenario will now be described where some flows in the network are ECN-capable and others are not. In this case the signals given by the above unqueueable ECN marking algorithm represent only the length of the ECN-capable packets in the queue, as if non-ECN capable packets were not present.

This is illustrated in FIG. 8, where packets containing no character label represent non-ECN capable packets, as shown in the legend at the bottom of the figure. Some arriving packets are not ECN-capable, while those that are carry the ECT(0) codepoint. The unqueueable ECN marking algorithm described earlier ensures that only one packet with an ECT(0) codepoint can be queued at any one time, but it takes no account of any other ECN codepoint.

In this example, at the start and at the end, no ECT(1) markings appear between ECT(0) markings, meaning that the number of ECN-capable packets in the queue at any one time is just one. In the middle of the sequence, an ECT(1) packet is interspersed between two ECT(0) packets on a couple of occasions. This means that two ECN-capable packets were in the queue when the later ECT(0) packet arrived. Even though the queue is actually longer, due to non-ECN capable packets, the algorithm does not count them.

In a scenario where there can be a mix of ECN-capable and non-ECN-capable traffic, the unqueueable ECN marking scheme does not give end-systems the full picture of the combined queue from all traffic. This can be either a limitation or an advantage.

The limitation is that the actual queue length including legacy traffic may be longer than the queue length reported by the unqueueable ECN marking scheme. Therefore the scheme cannot be used alone as the only congestion signaling mechanism; even sources that support it must also take note of pre-existing congestion signaling schemes, such as packet drop or the congestion experienced signals of the original ECN standard.

The advantage is that the signals from unqueueable ECN marking solely indicate the part of the length of the queue caused by end-systems that are using the scheme. Therefore, end-systems using the scheme can detect the results of their own collective attempts to keep the queue short without being confused by the behaviour of legacy nodes that do not support the scheme.

In a further embodiment the Unqueueable ECN marking scheme is used in combination with the original ECN marking scheme. As already explained, the original standard ECN approach involves a congested buffer marking a proportion of ECN-capable packets with the congestion experienced (CE) codepoint, instead of dropping them, which it would do if the same packets were not ECN-capable.

Therefore, by a similar argument to that concerning multiple flows given above, the unqueueable ECN marking scheme and the original standard ECN approach [RFC3168] can both be deployed and simultaneously applied to the same ECN-capable packets. At one node, as it processes each packet, it would be preferable for the unqueueable ECN algorithm to be executed after the original standard ECN marking algorithm, because the outcome of unqueueable ECN marking depends on the ECN codepoint in the incoming packet, whereas the original standard ECN marking does not. This ordering would ensure faster convergence on a precise value for the queue length between the signals.

If, as recommended, the original standard ECN marking is applied before unqueueable ECN marking, the signal will represent the average length of the queue of ECN packets without counting CE packets. Given, the proportion of CE-marked packets is typically small and nearly always very small, the error in estimated queue length will typically be very small too. The reasoning can be derived from the earlier reasoning about non-ECN-capable packets, because CE packets are also ignored by the unqueueable ECN marking algorithm.

However, the original standard ECN scheme might well mark packets at a congested node later in the path, following a node earlier in the path that has marked them with the unqueueable ECN scheme. In such cases, the signal will still give the correct average queue length, it will just take longer to converge on the average. The reasoning can be derived from the earlier reasoning about multiple flows sharing a bottleneck. CE marking is applied randomly so it can be thought of as a separate randomly selected subset of packets that will have the same effect on the queue length signal as will separating out a flow of packets.

When data flows pass through a number of buffers in a network, such as along the path through the network in FIG. 1, sometimes more than one buffer will become the bottleneck simultaneously, although it is more typical for the bottleneck to move between different buffers rather than a queue to form simultaneously in two or more.

In the case of two or more simultaneous bottlenecks, with the unqueueable ECN marking scheme in all of them, the resulting signal will give an estimate of the length of the longest of the queues. If the longest queue is later in the path, this measurement will be rounded up to the next integer multiple of the queue length earlier in the path.

For instance, referring to FIG. 1, let us assume that simultaneous constant queues have formed at the buffer into the uplink of CE router (13) and at the buffer into the downlink at PE router (16) for data transfers in the direction from CE router (13) to CE router (17). We shall use the notation q1 and q2 respectively for the two queue lengths, and q for the spacing between ECT(0) codepoints for traffic traversing both bottlenecks If q1≥q2, then the measured spacing will simply be $$q=q1;\ q1 \geq q2,$$

because only a few ECT(0) markings will leave the earlier bottleneck and the bottleneck later on the path does not revert any ECT(1) markings to ECT(0); it merely ensures that at most one ECT(0) codepoint is in the queue at any one time.

If q2>q1, then $$q=\lceil q2/q1 \rceil q1;\ q2 \geq q1,$$

because the earlier queue outputs occasional ECT(0) markings and the later queue can only remove some of these by re-marking them to ECT(1). It cannot move the remaining ECT(0) codepoints closer together, it can only leave them where they are.

($\lceil x \rceil$ is the way to indicate the ceiling function, that is the value of x rounded up to the next integer value.)

In a realistic case, the queue lengths will be variable rather than constant. Then the spacing between ECT(0) markings from the combined queues will vary and the average will be close to the results above.

It will now be described how a sender node can use the feedback of the unqueueable ECN marking signals. During the open-loop control phase of a flow, e.g. at flow-start when the sender is trying to sense how rapidly it could send out packets, it can send out brief bursts of packets at the rate of its attached interface (usually much faster than a bottleneck later in the path). It will send all packets with the ECT(0) codepoint in the ECN field.

We have already described end-to-end transport protocols that feedback the number of each ECN codepoint received. Therefore we will assume that the receiver returns feedback that indicates the resulting ECN codepoint after having passed through unqueuable ECN marking algorithms in the network.

Imagine that the sender sends an initial burst of ten equal-sized packets and after one round trip of delay the fed back ECN markings are, in order:

0,1,1,0,1,1,1,1,1,1, where 0 is shorthand for ECT(0) and 1 means ECT(1). This sequence implies that there was probably no queue at all when the first packet arrived (ie. this flow is probably alone in the bottleneck). The spacing of three packets between the first two ECT(0) markings also implies that the sent packet rate was more than two times and up to three times faster than the bottleneck rate.

In fact, if the sent packet rate were n times faster than the bottleneck rate, the spacing between ECT(0) markings would form the sequence $n$, $n^2$, $n^3$ etc., thus the fact that there is no subsequent zero and therefore the minimum spacing before the next ECT(0) marking is seven packets implies $n^2 \geq 7$. Therefore, from the above feedback sequence, the sender can infer that $n>2, n\leq 3$ and $n \geq \sqrt{7}$, or $2.65 \leq n \leq 3$.

As the first acknowledgements arrive at the sender, it could start releasing further packets while continually updating its best estimate of the available capacity. Once the feedback has arrived on the first four acknowledgements (ACKs), the sender's best estimate of n would be 2.5 (central between 2 and 3). It would therefore be able to start sending packets paced at about 1/2.5 of the rate at which it sent the first round of ten packets (the first round reference rate). Even just before the fourth ACK, the sender would know that n>2. Once all ten acknowledgements from the first round had been returned with no further zeroes in the feedback, its best estimate of n would be about 2.825 (central between 2.65 and 3). It could then increase its average sending rate to about 1/2.825 of the first round reference rate, as a reasonable estimate of the bottleneck rate. To improve its estimate of the bottleneck link rate, it should also add chirps to the pacing, which we will describe later.

When the second round of ACKs starts to arrive, they may all feedback ECT(0), which would imply the chosen rate has been too slow, perhaps only slightly. This is why chirping is also recommended (see later).

However, let us assume that the chosen pacing is instead slightly faster than the available capacity, and that the sequence of feedback returned is feedback on ACKs: 0,0,0,0,1,0,1,0,1,1,0,1,1,1,0,1,1,1,1,0, 1,1, . . .

This sequence implies that the queue is gradually growing as each packet arrives, as follows:

implied queue length: 1,1,1,1,2,2,2,2,2,3,3,3,3,4,4,4,4,4, 5,5,5,5, . . .

Because this sequence implies that the queue grows by about one packet in every four sent, this implies that the sender should slow down its pacing to send three packets in the time it had been sending four. Thus pacing out packets at about 75% of its previous rate should approximately match the bottleneck rate.

In a different scenario, if the ACK of the very first packet of a flow signals that ECT(1) was received, it reveals with certainty that other traffic is already queued in the bottleneck buffer. Then the sender will need to proceed with more caution than if the feedback on the first packet of each burst is ECT(0). In contrast, one initial ECT(0) ACK does not imply for certain that the sender is on its own, but the more often this happens, the more likely it is true.

The above examples show that the sender can use the rich information from unqueuable ECN signals in order to rapidly find the correct sending rate with much lower risk of overshooting. Simple algorithms like those above will be necessary to pace sent packets in immediate response to the ever-changing levels of such feedback.

As has already been pointed out, the sender may underestimate rather than overestimate the rate at which to pace outgoing packets, then the following round of feedback will probably signal just a stream of ECT(0) packets, which would give very little useful information on what rate to use next.

A more useful strategy would be to test a wide range of rates in each round by keeping to the overall chosen average rate over a sequence of packets, but varying the spacing between individual packets. The strategy that reveals information fastest, with least potential disruption to other traffic is to send 'chirps' of packets, where a chirp is a train of a small number of packets (e.g. 4 to 12) within which the inter-packet spacing gets closer and closer together, see Kühlewind et al "Chirping for Congestion Control—Implementation Feasibility" [5].

Alternatively, or in addition, packet sizes may be increased during each chirp. Changing the packet size also helps distinguish between different types of queues, namely if the queue is caused by inability to transmit bits fast enough or caused by inability to process headers fast enough.

In the first few packets of a chirp, the inter-packet sending rate will probably be below the bottleneck capacity and not form any queue. Then as the packets get closer together, they will start to induce a queue, and the unqueuable ECN marking algorithm will signal the length of this queue by re-marking the requisite number of packets to ECT(1). When one chirp ends and the next starts, it, will allow the queue to drain. Then part-way through the next chirp, the queue will start to build again. In this way, the sender can interrogate how much of a queue would build at a range of rates around the average rate, in order to adapt its rate up to the currently available capacity of the bottleneck. This process is possible whether the sender's data flow is alone in the bottleneck, or competing with other flows.

Unqueuable ECN marking provides an explicit measure of the point at which the queue starts to grow. Previous approaches based on chirping have had to accurately measure the change in queuing delay induced by the chirps, which provides a very noisy signal, because there are many other causes of variation in delay, such as interruptions from other processes in the operating system or hardware at either end or in the network. Also the change in delay by adding one more packet to a queue into a fast line is very small—typically much smaller than these other variations in delay. For instance, one extra 1500B packet of queue into a 1 Gb/s line induces an extra delay of (1500×8)b/1 Gb/s=12 microseconds. In contrast, the unqueuable ECN marking approach gives an explicit signal from which queue length (in packets, bytes and/or time) can be derived no matter how fast the line. Therefore it is proof against future increases in line-speed.

If the sender sends out all packets marked ECT(0) and feedback shows that nowhere on the network path have any been changed to ECT(1), it may be a sign of two possible scenarios:

the smallest available capacity on the path is greater than the highest rate at which the sender can send and therefore there is no network bottleneck the network bottleneck does not implement unqueueable ECN marking.

Even if some ECT(1) feedback is returned, this may be a sign that a first bottleneck implements unqueueable ECN marking, but then the traffic encounters a subsequent more constricted bottleneck that does not implement unqueueable ECN marking.

Therefore, to be safe, the sender should proceed cautiously if there are signs of a bottleneck that does not implement unqueueable ECN marking. It can test this by measuring the ACK-rate, that is, the rate at which acknowledgements are returned. Then it calculates a tentative rate that it will use based on unqueueable ECN markings. If the ACK-rate is significantly slower than this tentative rate, the sender should proceed cautiously (e.g. using the traditional TCP slow-start). If the ACK-rate and the tentative rate are approximately the same, the sender can assume that the rate it has tentatively inferred from unqueueable ECN marking is good to use.

This may raise the question of why the ACK-rate cannot always be used to determine the bottleneck capacity, making unqueueable ECN marking redundant. The answer is that it is hard to measure the ACK-rate accurately, whereas unqueueable ECN marking gives a precise explicit signal. Therefore, avoiding sending significantly faster than the ACK-rate is a useful safety check, but the ACK-rate alone is too imprecise to use alone.

The invention may be used for estimating the queue length at a node or across a path through a network of nodes to solve problems other than that where a sender wishes to quickly adapt its sending rate to the available capacity. For instance:

A test probe may wish to send a minimal amount of test traffic to measure available capacity; such a probe may be used:
  for the network operator to test the performance of the network while causing minimal disruption to existing traffic;
  for an application to test whether there is sufficient available capacity to start a new session with minimal disruption to existing traffic.

A network operator may wish to regularly monitor the length of queues in the network by passively measuring the spacing between ECT(0) markings in traffic passing a monitoring point, by selecting packets with source and destination addresses that indicate they have traversed a point of interest in the network, or a path of interest through multiple nodes.

A network operator or an application may send a stream of packets to monitor the delay due to queuing on the path indicated by the delay between two ECT(0) markings.

A network operator or an application may send a stream of packets to monitor the base delay along a path through the network by measuring the overall delay and subtracting the queuing delay. The one-way base delay could be measured by taking two packets that arrive at the receiver with ECT(0) markings and measuring the time between sending the second and receiving the first. The two-way base-delay could be measured similarly by echoing packets off an echo-server at the remote end of the network and adding together the one-way base delays in either direction, by monitoring the spacing between feedback of ECN markings in the forward direction and the spacing of ECN markings themselves in the reverse direction.

Alternatively, the base delay could be measured by sending a stream of well-spaced-out packets and measuring the delay for those that return with a sequence of ECT(0) values that prove no queuing had been experienced.

An alternative embodiment of Unqueuable ECN Marking will now be described with the aid of FIGS. 9 and 10. In this alternative process, the ECN markings on packets are not changed until they leave the queue. The only action when the packet arrives is to stamp it with the time that it arrived.

The flow diagram on the left of FIG. 9 details the enqueue process (92) of FIG. 6 for this alternative. The flow diagram on the right of FIG. 9 details the dequeue process (91) of FIG. 6 for this alternative. FIG. 10 shows the same scenario of arriving and departing packets as FIG. 5, but it illustrates how this alternative embodiment works, instead of the embodiment illustrated in FIG. 5.

The enqueue process is a simple loop in which, as each packet (pkt) arrives, at stage (110) the wall-clock time on arrival is stored in a memory structure associated with the packet (pkt.tsi), where tsi stands for 'timestamp in', because this is equivalent to time-stamping the packet on arrival. FIG. 10 shows the value of tsi stamped on each packet in the queue. For simplicity, all the packets that arrive within one timeslot (edged with thicker lines) are shown stamped with the same value, although in practice the granularity of timestamps may be finer. As time passes, these packets progress through the queue, which is depicted in FIG. 10 as packets with the same timestamp progressing diagonally down and to the right. At stage (105) the other normal steps necessary to enqueue a packet are carried out.

Pseudocode for this enqueue process is given below:

```
enqueue(packet) {
    foreach packet {
        write(time(now),pkt.tsi)
        % code to enqueue the packet here
    }
}
```

At the time the previous packet marked ECT(0) left the queue, the time will have been stored in a variable we shall call t0 at the relevant point (113) in the dequeuing process. The variable t0 therefore holds the "time the last ECT(0) packet left", and its value is shown changing below the horizontal axis in FIG. 10 every time an ECT(0) packet departs. We shall see that the timestamp was added during enqueuing, so that it can be compared with t0 when the packet is later dequeued.

In the first stage of the dequeue process the normal dequeuing steps are taken (108). Then in the first stage of the dequeuing side of this alternative unqueueable ECN marking embodiment (111), the packet at the head of the queue is checked to see if it carries the ECT(0) marking. If it does not, there is no need to determine whether it should be changed from ECT(0), so no further processing is necessary to complete the dequeuing process for that packet. But, if the packet carries the ECT(0) marking, it passes to stage (112).

At stage (112) the timestamp associated with the packet when it arrived is compared with the stored time t0 when the last ECT(0) marked packet departed. If the timestamp is no greater than t0, it implies that this packet arrived at the queue before the last ECT(0) packet left the queue. Therefore, this packet should be re-marked to ECT(1) at stage (114) because it was added to the queue when there was already another ECT(0) packet in the queue. If, on the other hand, the timestamp is greater than t0, it implies that this packet arrived after the last ECT(0) packet left the queue. Therefore, the ECT(0) codepoint on this packet is allowed to remain, because there were no other ECT(0) marked packets in the queue when it arrived. Thus, all that remains to do is pass to stage (113), where t0 is updated to store the current time, because this is the time that an ECT(0) packet has been dequeued.

Pseudocode for this dequeue process is given below

```
dequeue(packet) {
    foreach packet {
        % code to dequeue the packet here
        if (read_ECN(packet) == ECT0) {
            if (pkt.tsi > t0) {t0 = time(now)}
            else {write(pkt,ECT(1)}
        }
    }
}
```

It can be seen that this alternative process results in the same outcome as the embodiment originally depicted in FIG. 5 with reference to the flow diagrams in FIG. 7.

The time used as a reference for the timestamp tsi and the variable t0 need not be determined with any precision, as long as a common time reference is used in both the enqueue and dequeue processes. Indeed, any monotonically increasing number could be used as a reference as long as it increased by at least one increment every time any size packet departed and the numbers referred to by the enqueue and dequeue processes are incremented in synchrony.

A further alternative embodiment of the invention will now be described that encodes the queue length in a newly defined field in packet headers, rather than in the single remaining codepoint of the ECN field of the IP header. In this embodiment a multibit field is defined in the packet header as a queue length field. For instance, an IPv6 extension header may be defined specifically for this purpose, or a sub-field of the packet identifier (ID) field in the IPv4 header may be reused in packets in which the ID field is not used for its original purpose because the 'do not fragment' (DNF) flag is set.

A buffer implementing a naive version of this embodiment would maintain the length of the queue (e.g. in bytes) as an internal variable then write the current value of this number as an integer into every packet able to carry such a value in this newly defined field. A more practical version of this embodiment would write a standardised encoding of the queue length into this field. For instance the base 2 log of the queue length in bytes may be used, or a number in a standardised floating point format. It may write the queue length on arrival or on departure.

For packets arriving with a value other than zero already in this queue length counter field, the buffer would only overwrite the value with the length of its own queue if it was greater than the value already in the packet. In this way the scheme would signal the maximum queue on a path through the network.

The advantage of this embodiment is that an encoding of the precise value of the instantaneous queue length is made available in every packet, whereas in the embodiments described previously, the queue length can only be known precisely on the occasions when a packet carrying ECT(0) is received. One disadvantage of this embodiment is that it requires a new field to be defined in IP (and in other lower layer protocols). Another disadvantage is that the unit in which queue length is measured is restricted to that defined for the scheme (bytes in the example), whereas in the embodiments described previously the queue length can be measured in units of bytes, packets or time by choosing in which units to measure the spacing between marked packets.

Exemplary embodiments of the invention are realised, at least in part, by executable computer program code which may be embodied in application program data provided by program modules managing the buffers of respective routers, switches or other middleboxes in the network or in end-systems. When such computer program code is loaded into the memory of each router, switch, middlebox or end-system for execution by the respective processor, it provides a computer program code structure which is capable of performing the functions of the buffer in accordance with the above described exemplary embodiments of the invention.

Furthermore, a person skilled in the art will appreciate that the referenced computer program structure can correspond to the process flow shown in FIG. 7 or FIG. 9 where each step of the processes can correspond to at least one line of computer program code and that such, in combination with the processor in the respective router, switch, middlebox or end-system, provides apparatuses for effecting the described process.

The above embodiments are to be understood as illustrative examples of the invention. Further embodiments of the invention are envisaged. For example, the modules or part of the modules for effecting the described process can be implemented in hardware or a combination of hardware and software.

The method for determining the buffer queue length of an intermediate node, and the modules needed therefore, can be implemented in the sender node, the receiver node, another intermediate node or partly in each. For example the receiving node could calculate the queue length and feed it back together with the sequence of tag values to the sender node where after the sender could perform a more detailed analysis of the tag value sequence such as determining the discrepancy between the packet sending rate and the rate of the buffer and adapting the packet sending rate to the rate of the buffer.

In summary, there is provided a method and apparatus for changing a packet tag status value from a first value to a different value upon said packet arriving at a buffer if there already is a packet in the buffer queue having the same first status value. A sequence of tag status values in packets received at an end node is used to determine the queue length of the buffer in the packet network. An end node can thereafter adapt its sending rate to the rate of the buffer.

REFERENCES

[1] Satoh, D., Maeda, Y., Phanachet, O. & Ueno, H., "Single PCN Threshold Marking by using PCN baseline encoding for both admission and termination controls," *Internet Engineering Task Force* Internet Draft draft-satoh-pcn-st-marking-01 (March 2009) (Work in progress) <http://tools.ietf.org/html/draft-satoh-pcn-st-marking-01>
[2] Xia, Y., Subramanian, L., Stoica, I. & Kalyanaraman, S., "One more bit is enough," Proc. ACM SIGCOMM'05, Computer Communication Review 35(4):37-48 (2005)
[3] S. S. Kunniyur, "AntiECN Marking: A Marking Scheme for High Bandwidth Delay Connections," Proceedings, ICC, Alaska, May 2003.<http://www.seas.upenn.edu/~kunniyur/papers/aecn.html>

[4] Kühlewind, M. & Scheffenegger, R., "More Accurate ECN Feedback in TCP," *Internet Engineering Task Force* Internet Draft draft-ietf-tcpm-accurate-ecn-01 (July 2012) (Work in Progress)

[5] Kühlewind, M. & Briscoe, B., "Chirping for Congestion Control—Implementation Feasibility," In: *Proc. Int'l Wkshp on Protocols for Future, Large-scale & Diverse Network Transports (PFLDNeT'10)* (November 2010)

[6] US patent application 2002/097719 "Method and apparatus for traffic shaping for router queues/egress", Chaskar et al.

The invention claimed is:

1. A method for handling packets at a node in a packet network, the node having a queue for storing one or more packets, the method comprising:
    receiving at the queue a first packet carrying a status tag set to a first status value;
    determining that a stored packet already in the queue at the time of arrival of the first packet has upon leaving the queue a status tag set to the same first status value;
    changing the tag status value of the first packet to a different status value;
    dequeuing the stored packet from the queue;
    receiving at the queue a second packet carrying a status tag set to the first status value;
    checking if any packet already in the queue at the time of arrival of the second packet has upon leaving the queue a status tag set to the same first status value;
    transmitting a sequence of tag status values to another node in the packet network, the sequence including:
        a status tag associated with the stored packet set to the first status value,
        a status tag associated with the first packet set to the different status value, and
        a status tag associated with the second packet set to the first status value.

2. A method according to claim 1 further comprising stamping the received first packet with an indicator tsi indicating when the first packet arrived to the queue; storing a further indicator t0 indicating when the latest packet having a status tag set to the first status value left the queue; comparing the indicator tsi of the received first packet with the stored indicator t0 and if tsi is smaller than or equal to t0 changing the tag status of the received first packet to the different status value and if tsi is greater than t0 keeping the first status value.

3. A method for estimating a length of a queue of packets awaiting handling at a network node, which network node is arranged to operate in accordance with the method of claim 1, said method comprising:
    receiving at another node the sequence of tag status values associated with the first packet, second packet and stored packets which have been routed via said network node, where said tag status value is set to either a first or a different status value; and
    estimating the length of the queue at the time of arrival of the second packet from said sequence of tag status values.

4. A method according to claim 3 further comprising estimating the queue length by either determining the spacing between two packets in the sequence having their respective status tag set to said first status value, wherein said spacing represents the queue length at the instant the second packet arrived to the intermediate node in said packet network or by determining the number, length or duration of consecutive status tags set to the different status value in the sequence.

5. A method according to claim 3 comprising a receiver node estimating the queue length from said sequence of tag status values or alternatively, the receiver node sending an encoding of the sequence of tag values to a sender node and the sender node estimating the queue length.

6. A method according to claim 3 wherein if there is more than one flow in the packet network, the sender node of each flow estimating its own contribution to an aggregate queue length by varying its own data rate and correlating the different data rates with changes in the aggregate queue length.

7. A method according to claim 3 comprising a sender node adapting its transmission rate based on the determined queue length.

8. A method according to claim 3 further comprising a sender node sending out a train of packets within which the inter-packet spacing gets closer and closer together; determining from the sequence of status values how much of a queue that builds at a range of rates around the average rate, and adapting a sending rate up to the currently available capacity of a bottleneck node.

9. A method according to claim 3 wherein if the packets have traversed a sequence of network nodes, each comprising a queue, the node estimating the length of the longest queue.

10. A non-transitory computer readable storage medium storing computer program or suite of computer programs executable by a processor to cause the processor to perform the method of claim 3.

11. A non-transitory computer readable storage medium storing a computer program or a suite of computer programs executable by a computer processor to cause the computer processor to perform the method of claim 1.

12. The method according to claim 1, further comprising estimating the length of the queue from said sequence of tag status values, where the tag status values are set to either the first or the different status value.

13. The method according to claim 1, further comprising adapting a packet transmission rate of the node based on a length of the queue estimated based on the sequence of tag status values.

14. A node for handling packets in a packet network comprising:
    an interface arranged in operation to receive and enqueue a first and second packet each having a status tag set to a first status value;
    a queue for storing one or more packets; and
    a computer processor for executing instructions so as to provide a module arranged in operation to:
    determine that a stored packet already in the queue at the time of arrival of the first packet has upon leaving the queue a status tag set to the same first status value;
    change the tag status value of the first packet to a different status value;
    dequeue the stored packet from the queue;
    receive at the queue a second packet carrying a status tag set to the first status value;
    check if any packet already in the queue at the time of arrival of the second packet has upon leaving the queue a status tag set to the same first status value;
    transmit a sequence of tag status values to another node in the packet network, the sequence including:
        a status tag associated with the stored packet set to the first status value,
        a status tag associated with the first packet set to the different status value, and a status tag associated with the second packet set to the first status value.

15. A node according to claim 14 further comprising a store for storing an indicator t0 indicating when the latest packet having the status tag set to the first status value left the queue and wherein the module is further arranged in operation to stamp the received first packet with an indicator tsi indicating when the first packet arrived at the queue and to compare the indicator tsi of the received first packet with the stored indicator t0 and if tsi is smaller than or equal to t0 to change the tag status of the received first packet to the different status value or if tsi is greater than t0 to keep the first status value.

16. A node in a packet network arranged in operation to estimate a length of a queue of packets awaiting handling at a network node, which network node is adapted to operate according to claim 15, said node comprising:

an interface arranged in operation to receive the sequence of tag status values associated with the first packet, second packet and stored packets which have been routed via said network node, where said tag status value is set is to either a first or a different status value; and a module arranged in operation to estimate the length of the queue at the time of arrival of the second packet from said sequence of tag status values.

17. A node according to claim 16 wherein the module is further arranged in operation to estimate the queue length by either determine the spacing between two packets in the sequence having their respective status tag set to said first status value, wherein said spacing represents the queue length at the instant the second packets arrived at the intermediate node in said packet network; or to estimate the queue length from the number, length or duration of consecutive status tags in the sequence set to the different status value.

18. A node according to claim 14, wherein the computer processor executes instructions so as to provide a module arranged in operation to adapting a packet transmission rate of the node based on a length of the queue estimated based on the sequence of tag status values.

* * * * *